Aug. 11, 1964 D. B. LEVINSON 3,144,591

TIME DELAY RELAY

Filed May 11, 1962

INVENTOR.
DONALD B. LEVINSON,
BY
Walter J. Adam
ATTORNEY 3,144,591
TIME DELAY RELAY
Donald B. Levinson, Beverly Hills, Calif., assignor to Hughes Aircraft Company, Culver City, Calif., a corporation of Delaware
Filed May 11, 1962, Ser. No. 195,021
8 Claims. (Cl. 317—142)

Figure 1:
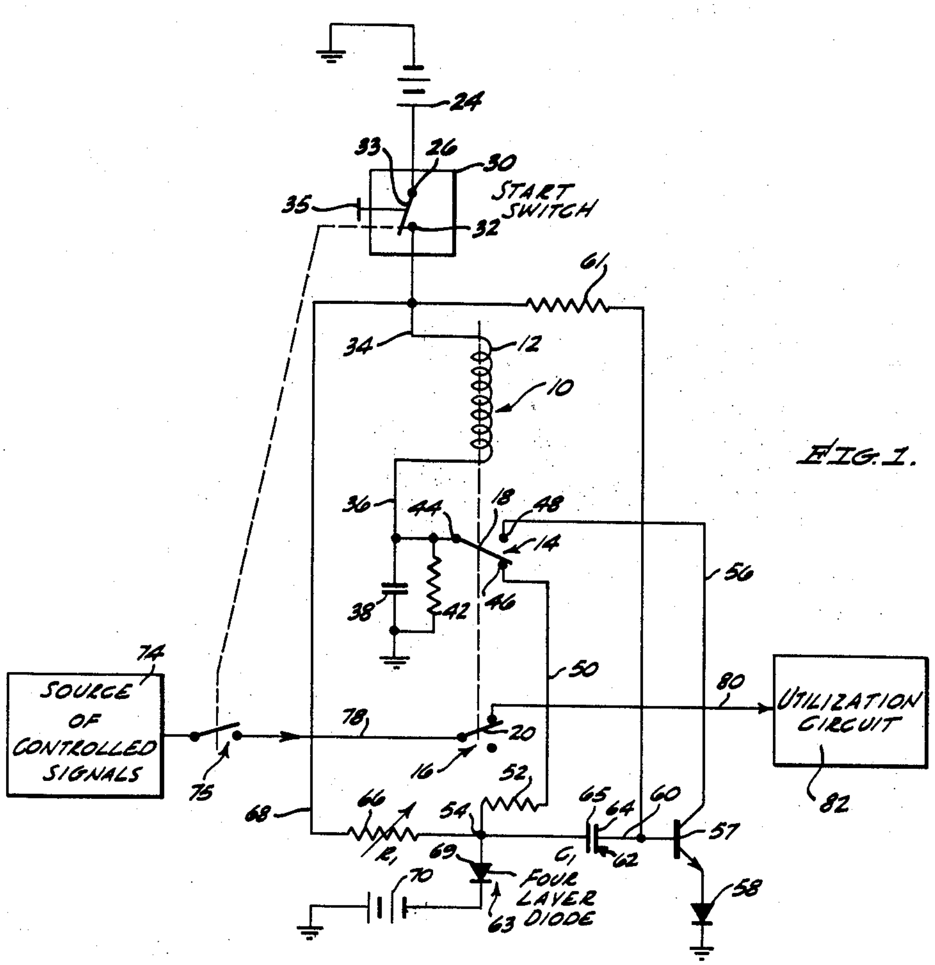

This invention relates to time delay circuits, and particularly to a time delay relay circuit utilizing semiconductor elements.

This application is a continuation-in-part of the copending application of Donald B. Levinson, Serial No. 53,004, filed August 30, 1960, entitled "Time Delay Relay," and now abandoned.

Circuits that provide a relatively long time delay and operate a relay at the end of the timing period have many general uses. For example, when initially starting an aircraft navigation system, certain portions such as the gyros must be energized for a predetermined period of time before applying power to the remainder of the electronic circuits in the system. The delay period must be accurately maintained regardless of temperature conditions so as to prevent inaccuracies from forming in the navigation system.

Prior art time delay circuits for controlling a relay include thermal devices, mechanical devices and electronic time delay circuits. Thermal devices are highly sensitive to the environmental temperature and thus have a poor accuracy. Mechanical time delay devices have the disadvantage of being subject to shock and vibration. Prior art electronic timers employing vacuum tubes have a relatively high power requirement and timers employing transistors generally utilize the transistor in an oscillator circuit for developing a high voltage to fire a gas tube, which arrangement does not provide an accurate time delay because the accuracy is related to the regulation of the developed voltage. Other electronic time delay circuits require that the energizing current for the relay pass through the timing circuit which restricts the size of timing elements. Also electronic time delay circuits generally provide that the relay remains energized after the timing interval which arrangement has the disadvantages of providing a large power loss and of resulting in the continued operation of the controlled circuits being dependent on the relay remaining energized.

It is thus an object of this invention to provide a time delay relay circuit for accurately providing a timing cycle regardless of temperature or vibration conditions.

It is a further object of this invention to provide a time delay relay circuit in which the relay is deenergized at the termination of a predetermined time interval.

It is a still further object of this invention to provide a simplified delay circuit utilizing semiconductor elements.

It is another object of this invention to provide a circuit for energizing a relay during a selected time interval by utilizing a timing device that operates independently of the relay energizing current.

It is still another object of this invention to provide a time delay relay that may perform a plurality of timing intervals with a minimum of required recovery between each timing interval.

Briefly, in accordance with this invention, a relay coil is coupled between a switched source of power and a relay switch for providing a current path through the coil to either a first or a second terminal of the relay switch. The first terminal provides a path for energizing current through a load current path of a transistor and the second terminal provides a path of steady state current to a timing device. The timing device is coupled to the switched source of power, to the base of the transistor and to the second terminal, and includes a negative resistance device responsive to the charging of a timing capacitor to develop a high impedance state during a selected time interval and a low impedance state after the timing interval. During the selected time interval, the timing device applies a first potential to the base of the transistor to pass energizing current through the relay coil, and at the end of the timing interval the timing device applies a second potential to the base of the transistor to de-energize the relay.

Figure 2:
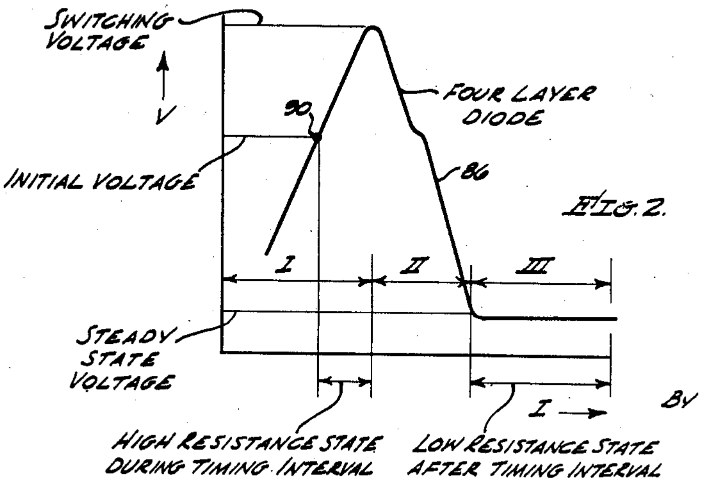

The novel features of this invention, as well as the invention itself, both as to its organization and method of operation, will best be understood from the accompanying description taken in connection with the accompanying drawing which:

FIG. 1 is a schematic circuit diagram of the time delay relay circuit in accordance with this invention; and FIG. 2 is a graph of voltage versus current showing the characteristics of the four layer diode negative resistance device of FIG. 1.

Referring first to FIG. 1, the time delay relay circuit in accordance with this invention includes a relay 10 having a coil 12, a first relay switch 14 and a second relay switch 16. The switches 14 and 16 have respective arms 18 and 20 controlled by the coil 12 to be in the position shown when the relay 10 is de-energized and in the opposite position when the relay 10 is energized. The energized condition of the relay 10 occurs during a selected timing interval. Energizing power is applied to the relay 10 from a source of positive potential such as a battery 24 having one end grounded and the other end coupled to a terminal 26 of a starting switch 30. A terminal 32 of the switch 30 may be coupled to the terminal 26 through a movable arm 33 in response to a push button 35 so as to apply the power through a lead 34 to one end of the coil 12. The switch 30 is a two state device remaining closed after initiation by the push button 35, for example. It is to be noted that the start switch 30 is shown as a movable arm type switch but may be an electronic switch responsive to a signal applied from a remote source. The other end of the coil 12 is coupled through a lead 36 to ground through a capacitor 38 and through a shunt resistor 42 to provide a discharge path for the capacitor 38. The relay switch 14 has an input terminal 44 coupled between the lead 36 and the arm 18 to contact either an output terminal 46 or 48. The output terminal 46 provides a current path through a lead 50 and a resistor 52 to a junction point 54. The other output terminal 48 provides a current path through a lead 56 to the collector of an n-p-n type transistor 57 operated as a switching means. The transistor 57 has an emitter coupled through a diode 58 to ground, which diode protects the base to emitter junction of the transistor from reverse bias operation. A resistor 61 is coupled between the lead 34 and the base of the transistor 57 to provide a source of base current when the transistor 57 is conductive during the selected time interval. The base of the transistor 57 is also coupled to a lead 60 and to the junction point 54 through plates 65 and 64 of a timing capacitor 62 of a timing device 63, the capacitor 62 having a value $C_1$. A current path is provided for charging the capacitor 62 through an adjustable timing resistor 66 having a value $R_1$ coupled from the junction point 54 through a lead 68 to the lead 34.

In order to provide a control potential to change the voltage at the junction point 54 from a high value during the timing period for maintaining the transistor 57 conductive and to a low value after the timing period to render the transistor 57 nonconductive, a four layer diode 69 is provided to act as a diode switch. An anode end of the diode switch 69 is coupled to the junction point 54 and a cathode end is coupled to a negative source of potential such as the negative terminal of a battery 70, the positive terminal being grounded. The four layer diode is a p-n-p-n semi-conductor switching device or negative resistance breakover device which develops a high resistance state before a switching or firing voltage is applied between the anode and cathode and develops a low resistance state after the switching voltage has been applied between the anode and cathode. It is to be noted that other types of negative resistance devices may be utilized in place of the diode 69 in accordance with the principles of this invention such as a neon tube or a thyratron circuit, both of which have similar characteristics.

The relay 10 may control a source of controlled signals 74 applied through a switch 75 and a lead 78 to the relay switch 16, and in turn through a lead 80 to a suitable utilization circuit 82. The switch 75 may be mechanically coupled to the start switch 30 to be closed at the same time and maintained in the closed position while the start switch 30 is closed. The switch 16 disconnects the source 74 from the lead 80 when the timing operation is initiated by the start switch 30. The source of signals 74 may be, for example, a source of power to be applied to the utilization circuits 82 after the time delay interval developed by the circuit in accordance with this invention. The start switch 30 may apply initial power to certain parts of a system, for example. It is to be noted that the relay 10 may control a plurality of relay switches such as 16. It is to be also noted that within the principles in accordance with this invention a p-n-p type transistor may be utilized for the transistor 57 by proper reversal of the polarities of the circuit.

In operation the time delay circuit of FIG. 1 responds to closing of the start switch 30 to apply transient current through the shunt capacitor 38 to ground. The leading edge of the voltage pulse developed by closing the start switch 30 is effectively shorted to ground through the capacitor 38 so that an energizing voltage is rapidly developed across the coil 12 causing the arm 18 of the relay switch 14 to contact the terminal 48 and the arm 20 of the relay switch 16 to break contact with the lead 80. At the same time, the switch 75 is closed so that only after the selected time delay when the relay 10 is again de-energized will the arm 20 couple the source of signals 74 to the utilization circuits 82.

After the shunt capacitor 38 is initially charged, the current from the lead 36 passes through the terminal 48 and the lead 56, and through the collector to emitter path of the transistor 57 to ground. The base of the transistor 57 is biased at a suitable positive potential above the voltage drop across the diode 58 to maintain the transistor 57 conductive and to provide a source of steady state base current thereto. The transistor 57 and the diode 58 present a relatively low impedance to current through the coil 12 so that there is a sufficient voltage drop across the coil 12 to maintain the relay 10 energized.

The timing period thus starts upon closing of the start switch 30. Since the lead 60 is coupled through the timing capacitor 62 to the junction point 54, the potential at the junction point 54 provides a reference voltage for the voltage applied to the base at the transistor 57 from the resitsor 61, which reference voltage is maintained by the characteristics of the diode switch 69.

The four layer diode 69 is a semiconductor two terminal device having avalanche characteristics that operates in either a low conductivity state, that is a high resistance state, or in a high conductivity state, that is a low resistance state. The operating regions as shown by a curve 86 of FIG. 2 includes an open region I where the current increases with increasing voltage up to a switching or firing voltage, a transition or negative resistance region II where the voltage falls from the switching voltage to a low level with increasing current, and a closed region III where a small voltage is developed across the diode with a large current flow. The four layer diode returns from region III to region I when the current supplied thereto drops below a threshold level which is slightly below the current requirements of region III. The diode 69 is thus switched from the high resistance state I to the low resistance state III by control of the voltage applied thereacross and the current supplied thereto. Therefore, when a switching voltage is applied across the diode 69, the diode which is essentially a voltage sensitive switch changes from a high resistance region to a stable low resistance region.

Upon closing of the start switch 30, the junction point 54 is at approximately ground potential at which condition the voltage developed by the battery 70 maintains the operating characteristic of the diode 69 at a point 90. The capacitor 62 then charges through the resistor 66 at a rate determined by the time constant $R_1C_1$ so that the charge on the plate 65 rises in potential to a pre-determined level that, combined with the potential of the battery 70, provides a voltage across the diode 69 equal to the switching or breakdown voltage. Thus, when the capacitor 62 is charged at the end of the selected time interval so that the switching voltage is impressed across the diode switch 69, the operating characteristic changes from the region I through the negative resistance region II to the stable low resistance region III. As a result of this negative resistance switching characteristic, a current flows through the capacitor 62 which causes the transistor 57 to go into a nonconductive state.

In response to the change of state of the diode 69, the junction point 54 falls to a relatively low potential as a result of the small voltage drop across the diode 69 and because the potential at the junction point 54 is effectively a reference to the voltage on the lead 60, the transistor 57 is biased out of conduction when the capacitor 62 discharges to provide an open switch. It is to be noted that in response to this voltage change at the point 54, a reverse current flows into the plate 64 of the capacitor 62 so that the transistor 57 is rendered non conductive in a very short time. The capacitor 62 rapidly discharges through the diode 69 when the diode 69 fires so that a low voltage transient equal to the change of voltage occurring at the point 54 is applied from the junction point 54 to the base of the transistor 57 to bias that transistor out of conduction long enough to de-energize the relay 12. As current is prevented from passing through the coil 12 and the lead 56 when the transistor 57 is biased out of conduction, the relay 10 is de-energized moving the arm 18 into contact with the terminal 46 so that steady state current flows through the coil 12, the lead 50, through the resistor 52 and through the low resistance of the diode 69 to the negative terminal of the battery 70. The resistor 52 has a relatively high value so that the steady state current through the coil 12, resistor 52 and diode 69 is sufficiently small to maintain the voltage drop across the coil 12 below the energizing voltage of the relay 10. The relay 10 is thus maintained de-energized at the end of the timing interval because the arm 18 is disconnected from the terminal 48 to prevent current from flowing to the collector of the transistor 57.

The diode 69 is maintained in state III by a sustaining current flowing through the resistor 52 because this steady state sustaining current is greater than the threshold current of the diode 69. If it were not for the sustaining current, the diode 69 would change to state I allowing the capacitor 62 to again charge and fire the diode 69 through the negative resistance region to state III, which cycling would be continuous. Although the relay 10 would not again be energized during that timing cycle because the arm 18 is disconnected from the terminal 48, transients and system noise may be introduced into the system by this constant cycling. Also, if a neon tube is utilized, the glow at the fired condition, as maintained by the sustaining current, may be utilized to indicate that the timing period is completed.

The resistor 52 provides a path for rapidly and completely discharging the capacitor 62 if an additional timing cycle is desired by again opening and closing the start switch 30. At the end of an initial timing period when the diode 69 fires to state III the capacitor 62 discharges in a path therethrough to the battery 70, to a voltage which may be several volts above ground as determined by the voltage drop across the diode 69. Thus, when the switch 30 is again opened, the capacitor 62 discharges completely and rapidly to ground through the resistor 52. Only a short delay is required before the switch 30 may again be closed to start another timing cycle. If it were not for the sustaining current maintaining the diode 62 at the low impedance state, the capacitor 62 may be partially charged because of the continuous cycling action, and a relatively long delay would be required before starting another timing period. It is to be noted that when a gas tube is utilized instead of the four layer diode 69, the voltage drop thereacross is even larger than with the diode 69, but the resistor 52 provides a rapid discharge path to allow an additional timing cycle to be accurately started with a minimum waiting period.

When the relay is de-energized, the capacitor 62 rapidly discharges through the resistors 52 and 66 to a value above ground as determined by the voltage drop across the diode 69. The circuit remains in the de-energized condition after the timing period as long as the start switch 30 is closed. Because of the rapid discharging of the capacitor 62 through the resistors 52 and 66, the timing cycles may be repeated at a rapid rate by opening and closing the start switch 30 after each cycle, while holding the start switch 30 open as the capacitor 62 discharges completely through the resistors 52 and 42 to ground. The diode 58 prevents the base to emitter junction of the transistor 57 from passing excessive current if the transistor 57 develops an avalanche condition as a result of the reverse bias rating thereof being exceeded after the timing interval. The circuit, in accordance with this invention, is highly reliable because the relay 10 is de-energized both before and after a timing period so that steady state operation after the timing interval of the utilization circuit controlled by the relay 10, such as the utilization circuit 82, is not interrupted by failure of the relay. The circuit is also reliable because the transistor 57 operates to latch the relay 10 during the timing period rather than to control a firing device and the timing period is determined primarily by the constant voltage on the lead 68 and the voltage of the battery 70.

When the relay 10 is de-energized at the end of the timing interval, the relay switch 16 also couples the source of controlled signals 74 to the utilization circuits 82. As discussed above, the start switch 30 may be coupled to other sources of signals (not shown) and the selected delay interval is required before application of signals of the source 74 to the utilization circuit 82.

Because the capacitor 62 controls the diode switch 69 which is essentially a voltage sensitive device, the capacitor 62 may have a relatively small value. Thus, the resistor 66 may have a relatively large value for a selected time constant and a capacitor with a small value and size may be utilized. Conventionally, when an RC circuit controls a relay, a resistor with a relatively small value is required to supply sufficient current to the relay coil making a capacitor with a large value necessary for long time constants. In the circuit in accordance with this invention, the current through the relay coil 12 when energized passes through the collector to emitter of the transistor 57 and not through the timing capacitor 62 or resistor 66.

While it will be understood that the circuit specification of the time delay relay in accordance with this invention may vary according to the design of any particular application, the following circuit specifications for a time delay relay are included by way of example only, suitable to provide a 90 second time delay:

| | |
|---|---|
| Battery **24** | 50 volts. |
| Battery **70** | 40 volts. |
| Coil **12** | 2.5K ohms. |
| Capacitor **38** | 1.75 microfarads. |
| Capacitor **62** | 0.2 microfarad. |
| Resistor **61** | 1 megohm. |
| Resistor **42** | 100K ohms. |
| Resistor **52** | 200K ohms. |
| Transistor **57** | 2N336. |
| Diode **58** | HD6565. |
| Four layer diode **69** | 4N60D Shockley Transistor Co. |

The four layer diode 69 is selected to have a firing voltage of 60 volts and the charge on the capacitor 62 thus rises in 90 seconds to approximately 21½ volts, which is a 20 volt rise above the 1½ volts on the lead 60. The circuit has been found to provide a 90 second delay time within an accuracy of +3%. The 90 second time delay may be selectively changed by varying the timing resistor 66.

Thus, there has been described a time delay relay circuit that accurately provides a time delay relatively independent of temperature changes. The timing arrangement includes a capacitor for controlling a negative resistance device which is responsive to the voltage of the capacitor to switch from a high impedance state to a stable low impedance state. The potential across the negative resistance device controls the switching operation of the transistor which has a load current path to conduct the energizing current for the relay. Therefore, the timing device is arranged separately from the energizing current path to allow selection of a desired time constant with the timing capacitor and resistor having desired values. A sustaining current is supplied to the negative resistance device to provide a stable device after the timing interval so that system noise and transients are minimized.

What is claimed is:

1. A time delay circuit responsive to a switched source of first potential comprising a second source of potential having one terminal coupled to one terminal of said switched source of first potential, relay means including a coil and a relay switch having an input terminal and a first and second output terminal with the input terminal coupled to another terminal of the switched source of first potential, a capacitor coupled from between said relay coil and the input terminal of said relay switch to said one terminal of said second source of potential, a transistor having a control electrode and having a load current path coupled between the first output terminal of said relay switch and said one terminal of said second source of potential, first impedance means coupled between the second output terminal of said relay switch and a junction point, a timing capacitor coupled between the control electrode of said transistor and said junction point, second impedance means coupled between said junction point and said another terminal of said switched source of first potential, breakover means coupled between said junction point and another terminal of said second source of potential, said breakover means having a first stable state with a relatively high impedance and a second stable state with a relatively low impedance, and third impedance means coupled between said another terminal of said switched source of first potential and the control electrode of said transistor.

2. A time delay circuit comprising first and second sources of potential having a common terminal, a starting switch having a first end coupled to another terminal of said first source of potential, a relay including a coil and including a relay switch having an input terminal and a first and second output terminal, said coil having a first end coupled to a second end of said starting switch and a second end coupled to the input terminal of said relay switch, a first capacitor coupled between a second end of said coil and said common terminal, a transistor having an emitter, collector and base with the collector coupled to said second output terminal of said relay switch and the emitter coupled to said common terminal, a second capacitor having a first and second plate with the first plate coupled to the base of said transistor, a first resistor coupled between the first output terminal of said relay switch and the second plate of said second capacitor, a current path coupled between said first end of said coil and the base of said transistor, a four layer diode coupled between the second plate of said second capacitor and another terminal of said second source of potential, and a second resistor coupled between the second plate of said second capacitor and the second end of said starting switch.

3. A time delay circuit responsive to a switched source of first potential comprising relay means having a current path with one end coupled to one terminal of the switched source of first potential, said relay means responding to the current therethrough to be energized and de-energized to switch said current path respectively to a first and a second terminal, a second source of potential having one terminal coupled to one terminal of said switched source of first potential, a four layer diode having a first end coupled to another terminal of said second source of potential, said diode operating as a switch to have a first state of high impedance in response to a low voltage and a stable second state of low impedance after being triggered by a high voltage, switching means having a control electrode and having a load current path coupled between said second terminal and said one terminal of said second source of potential, first impedance means coupled between said first terminal and a second end of said diode, a capacitor coupled between the control electrode of said switching means and the second end of said diode, a resistor coupled between the second end of said diode and said one terminal of said switched source of first potential, and a current path coupled between said one terminal of said switched source of first potential and the control electrode of said switching means, said relay being energized upon application of said first potential to pass current through said switching means and said capacitor charging to change said diode from said first state to said second state to bias said switching means out of conduction to in turn de-energize said relay means and pass current through said first impedance means to said diode.

4. A time delay circuit responsive to the application of a first potential to a first end of a relay coil to energize the relay for a predetermined time interval comprising a relay switch coupled to the second end of said relay coil to switch current to a first terminal when the relay means is de-energized and to a second terminal when the relay is energized, switching means having a control electrode and having a load current path coupled from the second terminal to one terminal of a second source of potential, said load current path having a relatively low impedance when said switching means is conductive, a junction point, a first resistor having a relatively high impedance coupled between said first terminal and said junction point, a capacitor coupled between the control electrode of said switching means and said junction point, a second resistor coupled between said junction point and the first end of said relay coil, a third resistor coupled between the first end of said relay coil and the control electrode of said switching means, and a negative resistance device coupled between said junction point and another terminal of said second source of potential, said device normally having a high impedance state and having a low impedance state when the potential applied thereto exceeds a switching voltage, said circuit responding to the application of said first potential to energize said relay and provide a current path through said switching means to maintain said relay energized while said capacitor charges, said capacitor charging in the predetermined time interval to bias said negative resistance device to said second state and render said switching means nonconductive, said relay thus being de-energized to pass current through said first resistor and through said negative resistance device for maintaining said negative resistance device at said low impedance state.

5. A time delay circuit comprising first and second sources of potential having a common terminal, relay means including a coil and a two position relay switch and having a current path coupled to another terminal of said first source of potential, switching means having a control terminal and and having a load current path coupled between the current path of said relay means and said common terminal, a four layer diode having a first end coupled to another terminal of said second source of potential, said diode having a first state of high impedance and being voltage responsive so as to change to a second stable state of low impedance, said second state being maintained in response to a sustaining current, first impedance means coupled between said relay switch and a second end of said diode, second impedance means coupled between said another terminal of said first source of potential and the control electrode of said switching means, capacitive means coupled between the control electrode of said switching means and the second end of said diode, and third impedance means coupled between the second end of said diode and said another terminal of said first source of potential, whereby upon application of a potential from said first source of potential said relay is energized to pass current through the load current path of said switching means, said capacitor charging through said third impedance means during a predetermined time interval so as to develop a voltage to change the impedance of said diode from said first state to said second stable state to bias said switching means out of conduction, de-energize said relay and pass said sustaining current to said diode.

6. A time delay circuit comprising first and second sources of potential having a common terminal, a starting switch coupled to another terminal of said first source of potential, relay means including a coil and a relay switch and having a current path coupled from said starting switch through said coil to said relay switch, said relay switch having a first and a second output terminal, switching means having a control electrode and a low impedance current path coupled from the first output terminal of said relay switch to said common terminal, a junction point, a high impedance current path coupled between the second output terminal of said relay switch and said junction point, a timing capacitor coupled between the control electrode of said switching means and said junction point, a timing resistor coupled between said junction point and said starting switch, a negative resistance device coupled between said junction point and another terminal of said second source of potential and responding to a potential rise at said junction point to change from a high impedance state to a low impedance state, and a second impedance means coupled between said starting switch and the control electrode of said switching means, said starting switch energizing said relay to pass current through said first current path and to cause said timing capacitor to charge through said timing resistor to a potential to bias said negative resistance device to said low impedance state so as to render said switching means nonconductive, said relay means thus being de-energized to switch the current path through the relay means to said second high impedance current path to maintain said relay means de-energized.

7. A circuit for developing a predetermined time delay comprising voltage source means for providing a high level of potential, an intermediate level of potential and a low level of potential, a starting switch having a first and second terminal with the first terminal coupled to said high level of potential, relay means including a coil and a relay switch having an input terminal and a first and a second output terminal, said coil having a first end coupled to the second terminal of said starting switch and a second end coupled to the input terminal of said relay switch, a first capacitor coupled between the second end of said coil and said intermediate level of potential, a transistor having a collector, emitter and base with the collector coupled to the first output terminal of said relay switch and the emitter coupled to said intermediate level of potential, a second capacitor having a first and second plate with the first plate coupled to the base of said transistor, a first resistor coupled between the second terminal of said relay switch and the second plate of said second capacitor, a diode switch coupled between the second plate of said second capacitor and said low level of potential, said diode switch having a high impedance state before a switching voltage is applied thereto and having a low impedance state after the switching voltage is applied thereto, a second resistor coupled between the second plate of said second capacitor and the second terminal of said starting switch, and a third resistor coupled between the base of said transistor and the second terminal of said starting switch, upon the closing of said starting switch, said relay means being energized to pass current through the collector and emitter of said transistor, said second capacitor charging during the predetermined time delay to develop said switching voltage to change said diode switch to said low impedance state and bias said transistor out of conduction to de-energize said relay means and pass current through said first resistor to said diode switch.

8. A time delay circuit comprising a switched source of first potential, a second source of potential having one terminal coupled to one terminal of said switched source of first potential, relay means including a coil coupled between another terminal of said first source of potential and said one terminal of said second source of potential and including a relay switch having an input terminal and a first and second output terminal, said input terminal being coupled to said coil, a transistor having a control terminal and having a load path coupled between the first terminal of said relay switch and said one terminal of said second source of potential, a capacitor having one plate coupled to the control terminal of said transistor, first impedance means coupled between the other plate of said capacitor and said another terminal of said first source of potential, a breakover device coupled from between said first impedance means and said capacitor to another terminal of said second source of potential, said breakover device having a first state with a relatively high impedance and responding to a switching voltage applied thereto to change to a second state with a relatively low impedance, said second state being maintained in response to a sustaining current, second impedance means coupled between the second terminal of said relay switch and said breakover device for passing said sustaining current thereto, and third impedance means coupled between said another terminal of said first source of potential and the control electrode of said transistor, said relay means being energized in response to a voltage applied from said first source of potential to conduct current through said transistor during a timing interval while said capacitor charges to apply said switching voltage across said breakover device, said breakover device in said second state biasing said transistor out of conduction to de-energize said relay means and supply a sustaining current to said breakover device.

References Cited in the file of this patent

UNITED STATES PATENTS

| | | |
|---|---|---|
| 2,165,048 | Gulliksen | July 4, 1939 |
| 2,785,346 | Large | Mar. 12, 1957 |
| 2,835,849 | Biedermann et al. | May 20, 1958 |
| 2,963,596 | Bross | Dec. 6, 1960 |
| 3,005,935 | Wood | Oct. 24, 1961 |
| 3,109,965 | Winchel | Nov. 5, 1963 |